UNITED STATES PATENT OFFICE.

LOUIS PRÉAUBERT AND GASTON A. THUBÉ, OF NANTES, FRANCE.

PROCESS FOR TARRING ROADS.

No. 812,593.        Specification of Letters Patent.        Patented Feb. 13, 1906.

Application filed May 5, 1905. Serial No. 259,032.

*To all whom it may concern:*

Be it known that we, LOUIS PRÉAUBERT and GASTON AMÉDÉE THUBÉ, citizens of the Republic of France, and residents of Nantes, France, have invented a new and useful Process for Tarring Roads, which process is fully set forth in the following specification.

Various attempts have been made for a long time to prevent the formation of dust upon roads by sprinkling them with heavy oils, tars, &c., this operation being known as "tarring" the roads.

The present invention has for its object the manufacture of a product perfectly adapted for tarring or asphalting roads, lanes, and paths, whether public or private, in order to obviate dust, this substance being also adapted to be used advantageously during the construction of such roads or the like in combination with the materials of which the bed or the crust of the road is formed.

This product consists of a mixture of bitumen, tar, asphalt, or any other bituminous body and of a solution of casein.

The manufacture takes place in the following manner: A solution of casein in water is prepared by means of an alkali, preferably sodium carbonate or other substance capable of rendering the casein soluble. By way of example the following proportions may be indicated: casein, eight kilograms; solvent, eight hundred grams; water, sixteen liters. The bitumen, tar, asphalt, or other bituminous substance adopted after having been softened by heat is mixed with the solution. This mixing is effected by stirring or kneading. The proportions which experience has shown to be the most suitable are as follows: solution of casein, twenty-five kilograms; asphalt, tar, bitumen, or other bituminous body, seventy kilograms. In this manner an exceedingly thick viscous product is obtained, and to it is added any appropriate antiseptic, creosote being particularly suitable. The product may be rendered more greasy by adding some fatty substance, such as lard. It may also be decolorized by an addition of lime or cement or colored by means of some coloring material. The product is then diluted with its own weight of water. In this form it is transportable, it keeps without alteration, and this is the state in which it is supplied. In order to utilize it for tarring roads, it is necessary to dilute it with two, three, four, or a greater number of times its own weight of water. The degree of dilution given to the product will depend upon the nature of the ground to be tarred or asphalted and upon the preliminary treatment to which such ground may have been submitted.

For a first treatment the product should be highly diluted in such a manner as to obtain sufficient penetration of the soil by the liquid, and the degree of dilution selected will of course depend upon the porosity of the ground. The more porous the ground is the greater the density of the liquid may be. For the second treatment the degree of dilution should be decreased, and so on.

When the product is employed in the construction of roads, in combination with materials such as concrete, stones, and the like of the road-surface, it should be but little diluted or not diluted at all, because under these circumstances it is a question of producing an actual paving.

In the case of wood paving it is advantageous to treat the blocks before they are placed in position by immersing them in the mixture indicated above.

Having now particularly described and ascertained the nature of our said invention and in what manner the same is to be performed, we declare that what we claim is—

1. The process herein described of making a product adapted for use for tarring or asphalting roads and public or private thoroughfares, the said process consisting in making a solution of casein in water in the presence of an alkali, adding thereto bitumen, asphalt, tar or other bituminous body previously softened by heat, and diluting the mixture with an appropriate quantity of water.

2. The new product herein described for tarring roads composed of a mixture of a solution of casein in water, and a bituminous body liquefied by heat.

3. The new product herein described for tarring roads composed of a mixture of a solution of casein in water in presence of an alkali, a bituminous body liquefied by heat, and water.

4. The new product herein described for tarring roads composed of a mixture of a solution of casein in alkaline water, a bituminous body liquefied by heat, a fatty substance, and water.

In testimony whereof we have signed this specification in the presence of two subscribing witnesses.

L. PRÉAUBERT.
G. A. THUBÉ.

Witnesses:
G. STEINBERG,
L. GOLDSCHMIDT.